United States Patent [19]

Reed

[11] Patent Number: 5,095,432

[45] Date of Patent: Mar. 10, 1992

[54] DATA PROCESSING SYSTEM IMPLEMENTED PROCESS AND COMPILING TECHNIQUE FOR PERFORMING CONTEXT-FREE PARSING ALGORITHM BASED ON REGISTER VECTOR GRAMMAR

[75] Inventor: Jonathan H. Reed, Palm Bay, Fla.

[73] Assignee: Harris Corporation, Melbourne, Fla.

[21] Appl. No.: 377,152

[22] Filed: Jul. 10, 1989

[51] Int. Cl.$^5$ .............................................. G06F 15/21
[52] U.S. Cl. .................. 364/419; 364/274.8;
364/972.1; 364/DIG. 1; 364/DIG. 2
[58] Field of Search ............ 364/419, 200, 900, 972.1, 364/274.8

[56] References Cited

U.S. PATENT DOCUMENTS 4,816,995  3/1989  Oerlemans et al. ................. 364/200
4,829,423  5/1989  Tennant et al. ..................... 364/200

Primary Examiner—Clark A. Jablon
Attorney, Agent, or Firm—Antonelli, Terry, Stout & Kraus

[57] ABSTRACT

A context-free parsing algorithm employing register vector grammars provides fast parsing of natural languages. A compiler for register vector grammars accepts input grammars as standard phase structure rules and generates strongly equivalent grammars in register vector grammar form. By applying the context-free register vector grammar parsing algorithm to the resulting grammars, strings may be parsed and trees may be constructed in the same manner performed with phase structure grammar.

4 Claims, 12 Drawing Sheets

| Phase Structure Grammar | Manually Computed Register Vector Grammar | | | Compiled Register Vector Grammar | | |
|---|---|---|---|---|---|---|
| S→NP VP | S: | init | 11 | S: | init | 100 |
| NP→det adj noun PP | | NP | 11 01 | | NP | 122 010 |
| NP→det adj noun | | VP | 01 00 | | VP | 212 001 |
| NP→adj noun PP | | close | 00 | | close | 221 |
| NP→adj noun | | | | | | |
| NP→det noun PP | NP: | init | 1111 | NP: | init | 11100 |
| NP→det noun | | det | 1111 0111 | | det | 12222 01100 |
| NP→noun PP | | adj | 2111 2011 | | adj | 21222 00100 |
| NP→noun | | noun | 2211 2201 | | noun | 22122 00011 |
| VP→AUX verb NP PP | | PP | 2201 2200 | | PP | 22212 00001 |
| VP→AUX verb NP | | close | 2202 | | close | 22221 |
| VP→AUX verb PP | | | | | | |
| VP→AUX verb | VP: | init | 1111 | VP: | init | 11000 |
| VP→verb NP PP | | AUX | 1111 0111 | | AUX | 12222 01000 |
| VP→verb NP | | verb | 2111 2011 | | verb | 21222 00111 |
| VP→verb PP | | NP | 2011 2001 | | NP | 22122 00011 |
| VP→verb | | PP | 2021 2000 | | PP | 22212 00001 |
| AUX→modal | | close | 2022 | | close | 22221 |
| AUX→modal not | | | | | | |
| AUX→have | AUX: | init | 1111 | AUX: | init | 101010000 |
| AUX→have not | | modal | 1111 0111 | | modal | 122222222 010000111 |
| AUX→be | | have | 0112 0010 | | not | 212222222 000000111 |
| AUX→be not | | have | 1111 0011 | | have | 221222222 000100011 |
| AUX→modal have be | | be | 0212 0000 | | not | 222122222 000000011 |
| AUX→modal not have be | | be | 1111 0001 | | be | 222212222 000001001 |
| AUX→modal have | | not | 2221 2220 | | not | 222221222 000000001 |
| AUX→modal not have | | close | 0222 | | have | 222222122 000000011 |
| AUX→modal be | | | | | be | 222222212 000000001 |
| AUX→modal not be | PP: | init | 11 | | close | 222222221 |
| AUX→have be | | prep | 11 01 | | | |
| AUX→have not be | | NP | 01 00 | PP: | init | 100 |
| PP→prep NP | | close | 00 | | prep | 122 010 |
| | | | | | NP | 212 001 |
| | | | | | close | 221 |

| Phase Structure Grammar | Manually Computed Register Vector Grammar | | | Compiled Register Vector Grammar | | |
|---|---|---|---|---|---|---|
| S→NP VP | S: | init | 11 | S: | init | 100 |
| NP→det adj noun PP | | NP | 11 01 | | NP | 122 010 |
| NP→det adj noun | | VP | 01 00 | | VP | 212 001 |
| NP→adj noun PP | | close | 00 | | close | 221 |
| NP→adj noun | | | | | | |
| NP→det noun PP | NP: | init | 1111 | NP: | init | 11100 |
| NP→det noun | | det | 1111 0111 | | det | 12222 01100 |
| NP→noun PP | | adj | 2111 2011 | | adj | 21222 00100 |
| NP→noun | | noun | 2211 2201 | | noun | 22122 00011 |
| VP→AUX verb NP PP | | PP | 2201 2200 | | PP | 22212 00001 |
| VP→AUX verb NP | | close | 2202 | | close | 22221 |
| VP→AUX verb PP | | | | | | |
| VP→AUX verb | VP: | init | 1111 | VP: | init | 11000 |
| VP→verb NP PP | | AUX | 1111 0111 | | AUX | 12222 01000 |
| VP→verb NP | | verb | 2111 2011 | | verb | 21222 00111 |
| VP→verb PP | | NP | 2011 2001 | | NP | 22122 00011 |
| VP→verb | | PP | 2021 2000 | | PP | 22212 00001 |
| AUX→modal | | close | 2022 | | close | 22221 |
| AUX→modal not | | | | | | |
| AUX→have | AUX: | init | 1111 | AUX: | init | 101010000 |
| AUX→have not | | modal | 1111 0111 | | modal | 122222222 010000111 |
| AUX→be | | have | 0112 0010 | | not | 212222222 000000111 |
| AUX→be not | | have | 1111 0011 | | have | 221222222 000100011 |
| AUX→modal have be | | be | 0212 0000 | | not | 222122222 000000011 |
| AUX→modal not have be | | be | 1111 0001 | | be | 222212222 000001001 |
| AUX→modal have | | not | 2221 2220 | | not | 222221222 000000001 |
| AUX→modal not have | | close | 0222 | | have | 222222122 000000011 |
| AUX→modal be | | | | | be | 222222212 000000001 |
| AUX→modal not be | PP: | init | 11 | | close | 222222221 |
| AUX→have be | | prep | 11 01 | | | |
| AUX→have not be | | NP | 01 00 | PP: | init | 100 |
| PP→prep NP | | close | 00 | | prep | 122 010 |
| | | | | | NP | 212 001 |
| | | | | | close | 221 |

Figure 3A     Figure 3B     Figure 3C

```
LET Xn = ⊣.
LET Si BE EMPTY (0 ≤ i ≤ n)
ADD <Φ, 11111, 0> TO So

FOR i = 0 TO n DO
    FOR EACH STATE <c,v,f> IN Si DO
        FOR EACH PRODUCTION <cat,cv,rv> OF c DO
            PREDICT: IF RVG-MATCH(cv,v) AND NONTERMINAL(cat) THEN
                ADD <cat, 11111, i> TO Si
            SHIFT: IF RVG-MATCH(cv,v) AND TERMINAL(cat) AND cat = Xi
                THEN ADD <c, rvg-apply(rv,v), f> TO Si+1
        COMPLETE: IF RVG-MATCH (CLOSE VECTOR OF c,v) THEN
            IF c = Φ AND i = n THEN SUCCESS.
            ELSE FOR EACH STATE <d,w,g> IN Sj DO
                FOR EACH PRODUCTION <c,cv,rv> OF d DO
                    IF RVG-MATCH (cv,w), THEN
                        ADD <d, RVG-APPLY (rv,w), g> TO Si
    IF i < n AND Si+1 IS EMPTY, THEN FAILURE
```

Figure 4

| | | | |
|---|---|---|---|
| S₀ (X₀ = det) | (S 11 0)<br>(NP 1111 0) | S₆ (X₆ = prep) | (NP 0101 4)<br>(PP 11 6)<br>(VP 0001 2)<br>(S 00 0) |
| S₁ (X₁ = noun) | (NP 0111 0) | | |
| S₂ (X₂ = modal) | (NP 0101 0)<br>(PP 11 2)<br>(S 01 0)<br>(VP 1111 2)<br>(AUX 1111 2) | S₇ (X₇ = det) | (PP 01 6)<br>(NP 1111 7) |
| | | S₈ (X₈ = noun) | (NP 0111 7) |
| S₃ (X₃ = verb) | (AUX 0111 2)<br>(VP 0111 2) | S₉ (X₉ = ⊣) | (NP 0101 7)<br>(PP 11 9)<br>(PP 00 6)<br>(NP 0100 4)<br>(VP 0000 2)<br>(VP 0001 2)<br>(S 00 0) |
| S₄ (X₄ = det) | (VP 0011 2)<br>(NP 1111 4)<br>(PP 11 4)<br>(S 00 0) | | |
| S₅ (X₅ = noun) | (NP 0111 4) | | |

Figure 5

| Earley's Algorithm | | New Algorithm |
|---|---|---|
| S→ . NP VP | 0 | (S 11 0)<br>(NP 1111 0) |
| NP→ . det adj noun PP | 0 | |
| NP→ . det adj noun | 0 | |
| NP→ . adj noun PP | 0 | |
| NP→ . adj noun | 0 | |
| NP→ . det noun PP | 0 | |
| NP→ . det noun | 0 | |
| NP→ . noun PP | 0 | |
| NP→ . noun | 0 | |

Figure 6

| Grammar | String | New Algorithm | Earley's Algorithm |
|---|---|---|---|
| G1 | $ab^n$ | $4n + 5$ | $4n + 6$ |
| G2 | $a^n b$ | $3n + 2$ | $4n + 2$ |
| G3 | $a^n b^n$ | $4n + 2$ | $6n + 3$ |
| G4 | $ab^n cd$ | $9n + 8$ | $13n + 10$ |
| NSE | $a(be)^n d^n (bed)^n b$ | $30n + 12$ | $34n + 14$ |
| Prop Calc | $(\sim p \wedge q') \vee (\sim p \wedge q')^n$ | $.5n^2 + 45.5n + 50$ | $.5n^2 + 79.5n + 88$ |
| GRE | $(ed)^n eab^n$ | $n^2 + 9n + 9$ | $1.5n^2 + 9.5n + 12$ |
| B1 | $aaa^n$ | $1.5n^2 + 11.5n + 15$ | $1.5n^2 + 17.5n + 24$ |
| B2 | $aaa^n$ | $1.5n^2 + 15.5n + 23$ | $3n^2 + 32n + 52$ |
| B3 | $aaa^n$ | $1.5n^2 + 20.5n + 30$ | $4.5n^2 + 47.5n + 82$ |

Figure 7

| GRAMMAR B1 (S) | | | | GRAMMAR B3 (S) | | | |
|---|---|---|---|---|---|---|---|
| S→A | S: | A 1 | 0 | S→A | S: | A 1 | 0 |
| A→BCD |  | 0 |  | A→BCD |  | 0 |  |
| B→aB | A: | B 111 | 011 | A→CDB | A: | B 1111 | 0111 |
| B→a |  | C 011 | 001 | A→DBC |  | C 2111 | 2011 |
| C→aC |  | D 001 | 000 | B→aB |  | D 2211 | 2201 |
| C→a |  | 000 |  | B→aC |  | B 1201 | 0200 |
| D→aD | B: | a 11 | 01 | B→aD |  | C 0100 | 0000 |
| D→a |  | B 01 | 00 | B→a |  | 0002 |  |
|  |  | 02 |  | C→aC | B: | a 11 | 01 |
|  | C: | a 11 | 01 | C→aD |  | B 01 | 00 |
|  |  | C 01 | 00 | C→aB |  | C 01 | 00 |
|  |  | 02 |  | C→a |  | D 01 | 00 |
|  | D: | a 11 | 01 | D→aD |  | 02 |  |
|  |  | D 01 | 00 | D→aB | C: | a 11 | 01 |
|  |  | 02 |  | D→aC |  | C 01 | 00 |
| GRAMMAR B2 (S) | | | | D→a |  | D 01 | 00 |
| S→A | S: | A 1 | 0 |  |  | B 01 | 00 |
| A→BCD |  | 0 |  |  |  | 02 |  |
| A→CDB | A: | B 111 | 011 |  | D: | a 11 | 01 |
| B→aB |  | C 211 | 201 |  |  | D 01 | 00 |
| B→aC |  | D 201 | 200 |  |  | B 01 | 00 |
| B→a |  | B 100 | 000 |  |  | C 01 | 00 |
| C→aC |  | 000 |  |  |  | 02 |  |
| C→aD | B: | a 11 | 01 |  |  |  |  |
| C→a |  | B 01 | 00 |  |  |  |  |
| D→aD |  | C 01 | 00 |  |  |  |  |
| D→aB |  | 02 |  |  |  |  |  |
| D→a | C: | a 11 | 01 |  |  |  |  |
|  |  | C 01 | 00 |  |  |  |  |
|  |  | D 01 | 00 |  |  |  |  |
|  |  | 02 |  |  |  |  |  |
|  | D: | a 11 | 01 |  |  |  |  |
|  |  | D 01 | 00 |  |  |  |  |
|  |  | B 01 | 00 |  |  |  |  |
|  |  | 02 |  |  |  |  |  |

Figure 8

|  |  | New Algorithm | | Earley's Algorithm | |
| --- | --- | --- | --- | --- | --- |
| Sentence | Length | Time (ms) | States | Time (ms) | States |
| 1 | 19 | 9265 | 1024 | 79709 | 4888 |
| 2 | 11 | 3858 | 524 | 28271 | 2853 |
| 3 | 26 | 25030 | 1937 | 170610 | 8006 |
| 4 | 11 | 5498 | 686 | 40455 | 3309 |
| 5 | 7 | 2064 | 338 | 11853 | 1863 |
| 6 | 1 | 365 | 75 | 2223 | 549 |
| 7 | 13 | 7184 | 817 | 54610 | 3906 |
| 8 | 4 | 1049 | 186 | 5539 | 1160 |
| 9 | 13 | 1827 | 415 | 8527 | 2309 |
| 10 | 12 | 4102 | 614 | 27865 | 3133 |

```
LET S_D = NEW-STATES = {{S_0}} ;
LET F_D = ∅ ;
WHILE NEW-STATES ≠ ∅ DO
   REMOVE A STATE X = {S_1,S_2,···,S_n} FROM NEW-STATES;
   FOR EACH TOKEN a IN Σ DO
      LET y = {t_1,t_2,···,t_n} BE THE SET OF STATES IN S_N TO WHICH THERE
         IS A TRANSITION ON a FROM SOME STATE S_i IN X (i.e. t_i ∈ T_N(s_i,a));
      IF y IS NOT ALREADY IN S_D THEN
         ADD y TO S_D;
         ADD y TO NEW-STATES;
         SET T_D(X,a) TO y ;
         IF A STATE t_i IN y IS ALSO IN F_N THEN ADD y TO F_D;
```

```
LET FEASIBLE-PAIRS = ∅;
FOR EACH PAIR OF DISTINCT STATES $s_i$ AND $s_j$ IN $S_D$ DO
    IF ({$s_i,s_j$} ⊂ $F_D$ OR {$s_i,s_j$} ⊂ $S_D - F_D$) AND
        ($T_D(s_i,a) = ∅$ iff $T_D(s_j,a) = ∅$, FOR EVERY TOKEN $a$ IN Σ) †
        THEN ADD {$s_i,s_j$} TO FEASIBLE-PAIRS;
LET PAIRS-TABLE BE A TABLE OF SETS OF STATES, WHOSE ROWS ARE
    INDEXED BY THE {$s_i,s_j$} OF FEASIBLE-PAIRS AND WHOSE COLUMNS
    ARE INDEXED BY THE TOKENS OF Σ;
FOR EACH SET {$s_i,s_j$} IN FEASIBLE-PAIRS DO
    FOR EACH TOKEN $a$ IN Σ DO
        SET PAIRS-TABLE ({$s_i,s_j$}, $a$) TO {$T_D(s_i,a$), $T_D(s_j,a)$};
LET INDISTINGUISHABLE-STATES = FEASIBLE-PAIRS;
REPEAT
    FOR EACH SET {$s_i,s_j$} IN INDISTINGUISHABLE-STATES DO
        FOR EACH TOKEN $a$ IN Σ DO
            LET {$t_i,t_j$} = PAIRS-TABLE ({$s_i,s_j$}, $a$);
            IF ($t_i ≠ t_j ≠ ∅$) AND ({$t_i,t_j$} NOT IN INDISTINGUISHABLE-STATES
                OR FEASIBLE-PAIRS) THEN REMOVE {$s_i,s_j$} FROM
                INDISTINGUISHABLE-STATES;
UNTIL NO MORE SETS {$s_i,s_j$} CAN BE REMOVED FROM
    INDISTINGUISHABLE-STATES;
```

Figure 14

|  | CONDITION VECTOR | RESULT VECTOR |
|---|---|---|
|  | MODAL₁ NOT₁ HAVE₁ NOT₂ BE₁ NOT₃ HAVE₂ BE₂ CLOSE | MODAL₁ NOT₁ HAVE₁ NOT₂ BE₁ NOT₃ HAVE₂ BE₂ CLOSE |
| INIT |  | 1 0 1 0 1 0 0 0 0 |
| MODAL₁ | 1 2 2 2 2 2 2 2 | 0 1 0 0 0 0 1 1 1 |
| NOT₁ | 2 1 2 2 2 2 2 2 | 0 0 0 0 0 0 1 1 1 |
| HAVE₁ | 2 2 1 2 2 2 2 2 | 0 0 0 1 0 0 0 1 1 |
| NOT₂ | 2 2 2 1 2 2 2 2 | 0 0 0 0 0 0 0 1 1 |
| BE₁ | 2 2 2 2 1 2 2 2 | 0 0 0 0 0 1 0 0 1 |
| NOT₃ | 2 2 2 2 2 1 2 2 | 0 0 0 0 0 0 0 0 1 |
| HAVE₂ | 2 2 2 2 2 2 1 2 | 0 0 0 0 0 0 0 1 1 |
| BE₂ | 2 2 2 2 2 2 2 1 2 | 0 0 0 0 0 0 0 0 1 |
| CLOSE | 2 2 2 2 2 2 2 2 1 |  |

Figure 17

```
AUX:  INIT            1 1 10
      MODAL  1 1 1 2  0 1 1 1
      NOT    2 2 2 1  2 2 2 0
      HAVE   1 1 1 2  0 0 1 1
      BE     1 1 1 2  0 0 0 1
      HAVE   0 1 1 2  0 0 1 0
      BE     0 2 1 2  0 0 0 0
      CLOSE  0 2 2 2
```

Figure 18

DATA PROCESSING SYSTEM IMPLEMENTED PROCESS AND COMPILING TECHNIQUE FOR PERFORMING CONTEXT-FREE PARSING ALGORITHM BASED ON REGISTER VECTOR GRAMMAR

BACKGROUND OF THE INVENTION

Natural language interfaces are becoming increasingly important components of expert systems and other complex computer systems. However, many applications of natural language processing (NLP) require rapid, real-time processing of data. By way of example, in airplane cockpits and in interactive database systems, natural language interfaces must operate at least as fast as their users in order to be truly effective. Other real time applications include voice responsive systems and voice synthesizing systems in which a computer-based system responds to and/or replies in a spoken language, e.g. English. Such rapid operation, however, is difficult to achieve.

A significant problem with NLP is efficiency. While user interfaces generally must operate in real-time to be effective, most NLP techniques have yet to achieve this speed. One reason for this is that NLP generally consists of multiple levels of analysis, including lexical (word-level), syntactic (parsing), semantic (meaning), and pragmatic (context and common sense), and it is not clear how to integrate these levels of analysis into a complete system. Another reason is that each individual level of analysis is inherently complex and subsequently compute-intensive. One level in particular, that of syntactic analysis, has historically received the most attention with respect to efficiency.

The goal of a parser, and of syntactic analysis in general, is to transform an input string, consisting of a number of words or tokens, into a representation which reflects the phrase structure of the string. This phrase structure is defined by a phrase structure grammar (PSG) of the language under consideration, as shown in FIG. 1A. The output of the parser typically takes the form of one or more parse trees, as shown in FIG. 2. Parsing is very difficult to perform efficiently. The landmark paper "An Efficient Context-Free Parsing Algorithm," by Jay Earley, published in *Communications of the ACM*, Volume 13, No. 2, pages 94-102, 1970, the disclosure of which is incorporated herein by reference, presents an algorithm capable of parsing the languages of arbitrary context-free grammars in $\theta(n^3)$ time, and certain subclasses of these languages in $\theta(n^2)$ and even linear time, where n is the length of the input string or the number of words. Since the publication of Earley's paper, researchers in the fields of computer science, linguistics, and more recently, artificial intelligence (AI) have tried to improve on Earley's results, but have had little success.

A different approach to parsing is register vector grammar (RVG). RVG is a finite-state automaton which can be utilized as a very compact and efficient parser, as described in "A New Kind of Finite-State Automaton: Register Vector Grammar," by Glenn David Blank, *Proceedings of the Ninth International Joint Conference on Artificial Intelligence*, pages 749-755, Morgan Kaufmann, Inc., Los Altos, California, 1985, the disclosure of which is incorporated herein by reference, and in "Register Grammar Syntax in Ten Easy Lessons," an unpublished paper by A. E. Kunst, University of Wisconsin, Madison, Wisconsin, 1985. The name "register vector grammar" derives from the fact that grammar productions are encoded by ternary-valued registers or vectors, as shown in FIG. 1B.

FIGS. 3A and 3B illustrate a traditional PSG and a manually derived equivalent RVG for simple English sentences. Note that both grammars define a set of productions, or subgrammar, for each nonterminal NP, VP, etc. However, while the PSG uses the familiar x →y rewrite rule form for productions, the RVG productions take the form of a nonterminal or terminal category followed by ternary-valued condition and result vectors. The RVG additionally specifies an initialization vector and a close vector for each nonterminal subgrammar. The advantage of the RVG formalism is the efficiency that can be attained by manipulating productions of this form. A bit-level implementation can be used, and vectors can store and test more parse state information than the standard dotted item x→y·z.

Unfortunately, precisely because of the compact vector representation from which efficiency is derived, RVGs are difficult to write and to understand. Kunst, for example, has noted in a personal communication that "R(V)G's succinctness is no easier to 'read' than a gene." Further, the difficulty increases greatly as grammars increase in size. This situation is rather ironic since the real power of RVG comes when it is applied to large and ambiguous grammars such as those of natural languages. In "A Small Finite Processor for Natural Language Syntax," an unpublished paper by Glenn David Blank, Lehigh University, Bethlehem, Pennsylvania, Blank also recognizes the problem and describes a more intuitive symbolic RVG notation which may be automatically "assembled" into the numerical vector form before execution.

SUMMARY OF THE INVENTION

The present invention concerns a new parsing algorithm which combines the control structure of Earley's algorithm with the bit-vector representation of RVG to achieve significant improvements in efficiency. While maintaining Earley's $\theta(n^3)$ bounds in the worst case, the new algorithm operates five to ten times faster than Earley's algorithm, depending on the size and ambiguity of the grammar. In particular, the larger and more ambiguous the grammar, the greater the improvement. The new algorithm is, thus, a particularly efficient general context free parsing algorithm.

The present invention also concerns compiler for the new algorithm. The compiler accepts input grammars written as standard phrase structure rules and generates strongly equivalent grammars in RVG form. For example, the RVG of FIG. 3C was produced by compiling the PSG FIG. 3A. The RVG compiler enables grammar developers to use the familiar PSG formalism, yet to compile their grammars into RVG for more efficient execution. Further, developers need not even be aware of the underlying RVG formalism nor its machine-code-like representation. By applying the context-free RVG parsing algorithm to the resulting grammars, strings may be parsed and trees may be constructed in the same manner currently performed with PSG.

BRIEF DESCRIPTION OF THE DRAWINGS

These and other aspects and advantages of the present invention are more apparent from the following detailed description and claims, particularly when considered in conjunction with the accompanying drawings. In the drawings:

FIGS. 3A, 3B, and 3C, respectively, set forth for simple sentences the equivalent PSG, manually derived RVG, and RVG compiled in accordance with the present invention;

FIG. 4 sets forth an algorithm illustrative of the present invention;

FIG. 5 sets forth the complete trace of the algorithm when applied to the sentence "The girl might hit the boy with the ball";

FIG. 6 sets forth a comparison of the state sets in Earley's algorithm and in the new algorithm;

FIG. 7 sets forth a comparison of the results of tests of Earley's algorithm and the new algorithm on a variety of grammars and input strings;

FIG. 8 shows three of the grammars utilized in the tests involved in FIG. 7;

FIG. 14 presents the Pairs Table algorithm for identifying states to merge, in accordance with the present invention;

FIG. 17 shows an RVG definition table for translating the FSA of FIG. 16 into RVG form; and FIG. 18 shows an RVG for English auxiliaries which has been optimized by hand.

DETAILED DESCRIPTION OF A PREFERRED EMBODIMENT

1) Register Vector Grammar Representation

Figures 1A, 1B, 2:
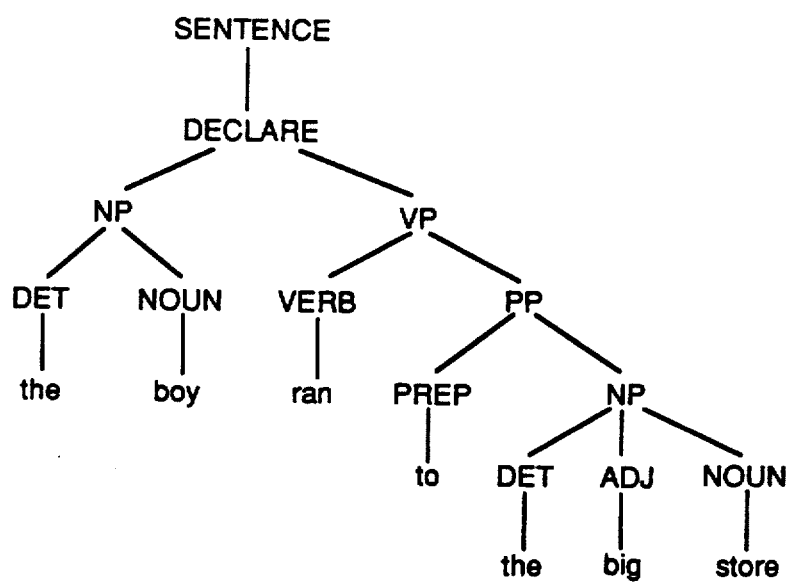
FIGS. 1A and 1B, respectively, set forth the equivalent PSG and RVG for simple noun phrases.
FIG. 2 depicts a typical parse tree.

A context-free RVG consists of a separate subgrammar for each nonterminal token S, NP, VP, etc. Each subgrammar consists of an initialization vector, a set of productions, and a close vector. Each production consists of a lexical category cat, a condition vector cv, and a result vector rv. The ternary values composing these vectors are 0 (off), 1 (on), and 2 (mask), where each value represents the status of an arbitrary syntactic feature. Semantic features can be encoded as well, as shown in *Lexacalized Metaphors: A Cognitive Model in the Framework of Register Vector Semantics*, Ph.D. Dissertation by Glenn David Blank, University of Wisconsin, Madison, Wisconsin 1984.

The RVG representation also includes two primitive operations:

1. rvg-match, which tests the applicability of a grammar production, and
2. rvg-apply, which applies a production following a successful match.

Both operations work in a bit-wise fashion in which, for purposes of matching, the 0 and 1 values match only themselves, while 2 matches anything, and for purposes of applying, 0 and 1 change feature values to themselves while 2 carries through the existing value. Using integers for vectors, the match and apply operations can be implemented in as few as three and eight machine instructions, respectively. Greater detail about the rvg-match and the rvg-apply operations can be found in the above-cited works by Glenn David Blank.

2) The New Algorithm

The algorithm of the present invention processes an input string $X_0 \ldots X_n$ from left to right in a bottom-up, breadth-first manner. The processing of each token $X_i$ consists of constructing a set of states $S_i$ which carry along all possible parses of the input string up through $X_i$. Each state in the set consists of:

1. a nonterminal category which derives that portion of the input string currently being processed,
2. an RVG vector which represents the state of the parse of this category as defined by the category's RVG production set, and
3. the index of the state set in which the state was originally created.

More formally, a state is a triple $<c,v,f>$ where $c \in$ nonterminal vocabulary, v is an RVG vector, and $f \in 0 \ldots n$. Each RVG state may optionally include a k-token look-ahead string to enable the algorithm to rule out parses which cannot account for the next k input tokens. For the sake of simplicity, look-aheads are not included in this specification of the algorithm but may be added and utilized as described in the above-cited paper "An Efficient Context-Free Parsing Algorithm" by Jay Earley. The triple is represented here as a string, binary integer of arbitrary length, and decimal integer enclosed within parentheses: (NP 01011 0).

The construction of a state set $S_i$ consists of processing each of its states, in order, with three operations: predict, shift, and complete. These operations may add more states to state set $S_i$ as well as to state set $S_{i+1}$ which must then be processed by the same three operations. Duplicate states are not added to the same state set. If the processing of state set $S_i$ is completed and then state set $S_{i+1}$ is empty, the input string is invalid with respect to the grammar, and the parse fails. Otherwise, processing continues on state set $S_{i+1}$. The algorithm is initialized by adding the single state ($\phi$init O) to state set $S_0$ where $\phi$ is the root category of the grammar and init is the initialization vector of the subgrammar associated with $\phi$.

A state $<c,v,f>$ in state set $S_i$ is processed first by attempting to apply the predict and shift operations. This is done by scanning the RVG productions associated with c to find those whose condition vector cv matches v, using the rvg-match operation. If a production whose category is nonterminal matches, then the predict operation is applicable to the state and the production. This operation adds to state set $S_i$ a new state consisting of the production's nonterminal category, the initial vector, and index i. If a production with a terminal category matches and the terminal is the same as input token $X_i$, the shift operation is applicable to the state and the production. This operation adds to state set $S_{i+1}$ a copy of the state being processed with its vector updated by applying the result vector rv of the production to y, using the rvg-apply operation.

Once all of the productions of category c have been checked for the applicability of the predict and shift operations, the close vector associated with c is checked to see whether the complete operation is applicable to the state. This is done by matching the close vector with v. If the match is successful, f is used to add to state set $S_i$ all of the states in $S_f$ which are waiting on the completion of a parse of c. A state $<d, w, g>$ in set $S_f$ is defined to be waiting on a parse of c if its d has a production whose cat is c and whose cv matches w. Before such a state is added to state set $S_i$, its vector is updated by the application of the production's rv.

In the final state set $S_n$ the input token $X_n$ is set to a dummy terminator symbol ⊣ which identifies the end of the string. Actually, k +1 terminators are appended to the right of the input string, where k is the number of look-ahead tokens utilized. A successful parse is identified in this set if a state is completed whose category is $\phi$. A formal specification of the algorithm is given in FIG. 4.

Of course, the algorithm described above is only a recognizer, and as a parsing algorithm must be enhanced to build parse trees. This is done in the same way as in Earley's algorithm, by creating a pointer structure within state sets $S_0 ... S_n$ relating nonterminals to their constituent structures. Each time the complete operation adds a state $<c_1, v_1, f_1>$ to state set $S_i$, it associates with the state a pointer to the state $<c_2, v_2, f_2>$ in state set $S_i$ which initiated the operation. This indicates that $c_1$ has a constituent $c_2$. As other constituents of $c_1$ are found, their pointers are also added, in order, to the state. If $c_2$ is ambiguous, other states cause the complete operation to attempt to add $<c_1, v_1, f_1>$ to state set $S_i$, creating a set of pointers to the possible parses of $c_2$. Following a successful parse, a pars forest hangs from the success state $<\phi, v, O, >$ which may be traversed to extract the individual parse trees.

Example of the New RVG Parsing Algorithm

To trace through the operation of the algorithm on the illustrative input string "the girl might hit the boy with the ball" (det noun modal verb det non prep det noun) using the sentence grammar of FIGS. 3A and 3B, the first step is initializing $S_0$ with $S_0$: (S 11 O) since S is the root of the grammar. Then each of the states in state set $S_0$ is processed in order, beginning with this state. First the products associated with the states' category S are scanned to find those with a cv which matches the state's vector 11. The noun phrase (NP) production satisfies this test, and since NP is a nonterminal category, the predict operation is applied to add to state set $S_0$ the state $S_0$: (NP 1111 O).

The cv of the verb phrase (VP) production of state set S does not match 11 so it is not applicable. Next it is determined whether the close vector associated with state set S matches 11. Since it does not, the complete operation cannot be applied and the first state is finished. Going on to the second state, the productions associated with NP are scanned, and it is found that the cv of det matches 1111. Since det is a terminal category and input token $X_0$ is also a det, the shift operation is applied. This operation calls rvg-apply on det's rv 0111 and the states' v 1111 to add to state set $S_i$ the state $S_1$: (NP 0111 0).

Continuing with NP's other productions, the cvs of adj and noun also match 1111, but since they are terminal categories and $X_0$ is a det, the shift operation cannot be applied. The close vector of NP does not match 1111 either, so the processing of the second state in state set $S_0$ is complete. At this point there are no more states in state set $S_0$ to process. Since the operation is not yet in the last state set ($S_9$), it is confirmed that state set $S_i$ is not empty, and processing of it begins. The only state in state set $S_1$ so far has NP as its category, and so the NP productions are scanned again, this time matching their cvs against vector 01111. Both the adj and noun productions match, but input token $X_1$ is a noun, so only the shift operation is applied to the latter, and state S: (NP 0101 0) is added to state set $S_2$. The NP close vector does not match 0111, so the operation proceeds to the remaining states in state set $S_1$. There are none, state set $S_2$ is not empty, and the operation proceeds to the next state set. State set $S_2$ begins again with an NP state, this time matching against 0101. The only NP production which matches it is PP, which is a nonterminal, and so the predict operation is applied to the state to add (PP 11 2) to state set $S_2$. This is the first state with an index other than 0 because the predict operation created it during the processing of state set $S_2$. The NP close vector is checked once more and this time found to match 0101. Thus, for the first time the complete operation is applied. This operation uses index 0 of the state being processed to go back to state set $S_0$ and look for states waiting on the completion of the NP category. The first state in state set $S_0$ contains category S, so the NP production associated with S is matched against the state's vector 11. The match succeeds, and the complete operation adds to state set $S_2$ a third state (S 01 0).

The vector of this state is also produced by rvg-apply, using the production's rv and the state's y. There are no other NP productions associated with S, so the complete operation looks at the other state in state set $S_0$. Since NP has no NP productions associated with it, nothing can be done. The complete operation therefore ends, and the algorithm moves on.

FIG. 5 shows the complete trace of the algorithm on this example. It is to be noted that in the last state set $S_9$ the presence of the S state indicates success. In fact, due to the prepositional phrase at the end of the input string, the algorithm finds two ambiguous parses. This is reflected in the state set $S_9$ by the two VP states, indicating that category VP, initiated in $S_2$, is satisfied by the input string in two different ways.

4) Theoretical and Empirical Analysis of RVG Parsing

The RVG-based parser is an $n^3$ algorithm in the general case. That is to say, there exists some number C such that $Cn_3$ is an upper bound on the number of primitive operations required to parse an input string of length n with respect to an arbitrary context-free grammar. (For comparison with Earley's algorithm, the primitive operation counted in this section is the successful addition of a state to a state set.) This is as one might expect, considering that Earley's algorithm is $\theta(n^3)$ and the present algorithm shares the same control structure. The present algorithm also shares Earley's $\theta(n^2)$ results on unambiguous grammars and linear results on grammars of bounded-state. Reference is made to the above-cited paper "An Efficient Context-Free Parsing Algorithm" by Jay Earley for an argument of this analysis. The present algorithm, however, is significantly faster than Earley's in the average case. This is due to the fact that the present algorithm is based on a vector representation of state, while Earley's utilizes an item representation. An Earley item consists primarily of a grammar production and a dot indicating how far through the production the algorithm has progressed considering the current input token. FIG. 6 shows the Earley states that would be created in terms of these items in state set $S_0$ of the previous example, along with the corresponding RVG states. For each NP grammar production Earley's algorithm adds a different NP state to the state set, representing one way in which the category might be parsed. However, the set of the present algorithm contains only one NP state in which all of the ways of parsing an NP are encoded in the state's vector 1111. This illustrates how the RVG and Earley methods are combined: the right-hand side of the Earley items is replaced by an RVG vector. While an Earley state represents the possible utilization of a single grammar production in the overall parsing process, the state of the present algorithm represents the possible application of many productions. This reflects the functionally complex nature of RVG. A vector stores more information than an item.

The number of productions for a specific nonterminal category of a context-free PSG can be called the branching factor of the category. The average branching factor of all the nonterminal categories composing a grammar is called the branching factor of the grammar. FIG. 6 indicates that, j whereas the number of states added by Earley's algorithm increases as the branching factor increases, this is not necessarily the case with the present algorithm. The vector of one of the states in the present algorithm may absorb, representationally, many additional productions. Thus, the improvement in efficiency offered by the present algorithm may be characterized primarily as an insensitivity to the branching factors of grammars.

Empirical results were obtained by testing the present algorithm against Earley's algorithm on a variety of grammars and input strings. All testing was performed on a Symbolics 3640 computer. In order to compare only the bare-bone algorithms, look-ahead strings and first sets were not utilized, nor were parse trees constructed. FIG. 7 presents closed-form expressions for the number of primitive operations required with respect to 10 different grammars. The first seven were taken from the above-cited paper "An Efficient Context-Free Parsing Algorithm" by Jay Earley, while the last three are shown in FIG. 8 and were explicitly designed to test branching factors. All ten grammars are listed roughly in order of increasing size, complexity, and ambiguity, and therefore branching factor so the results show gradual improvement throughout. Focusing on the last three grammars, however, the present algorithm shows significant improvement over Earley's. Whereas the number of states added by the present algorithm increases by approximately $4n + 8$ as the branching factor increases from approximately 2 in B1 to 3 in B2 and 4 in B3, the number of states added by Earley's algorithm increases by approximately $1.5n^2 + 15n + 28$. In terms of time (not shown), the results on all 10 grammars show the same order of improvement as well.

Figures 9, 10:
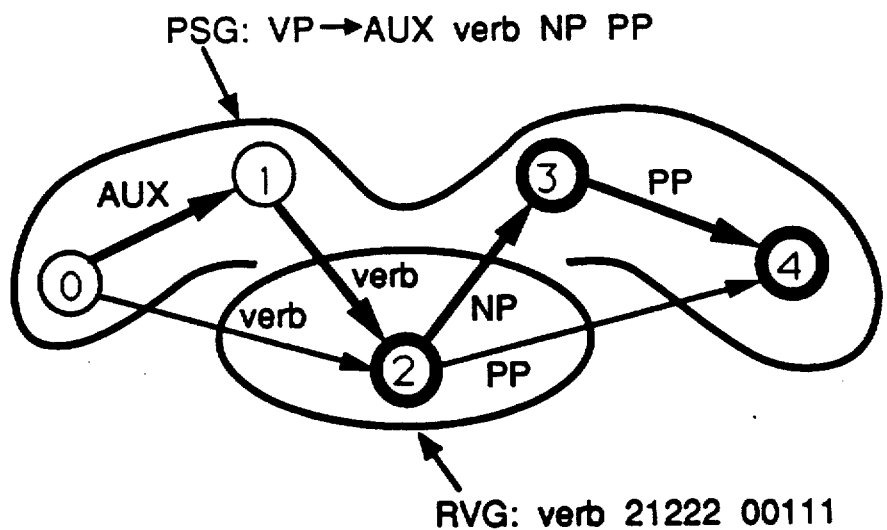
FIG. 9 shows results of another test of the new algorithm.
FIG. 10 illustrates a finite-state automaton (FSA) for the subgrammar defined by the VP productions from FIG. 3A.

The present algorithm was also tested on the large grammar of English set forth in *An Efficient Context-Free Parsing Algorithm for Natural Languages and Its Application*, PhD Dissertation by Masaru Tomita, Carnegie-Mellon University, 1985. This grammar contains 396 productions with a branching factor of 8.6. FIG. 9 shows the number of primitive operations and amount of time (in milliseconds) required on a sampling of 10 inputs. The results indicate that on this large natural language grammar, the present algorithm adds four to eight times fewer states than Earley's and executes five to ten times faster.

The present algorithm is a general context-free parsing algorithm by virtue of the fact that, for any arbitrary context-free PSG, a strongly equivalent RVG can be constructed and processed. Another indication of the functional complexity of RVG is that such grammars are typically smaller than their equivalent PSGs. For example, the simple sentence RVG of FIG. 3B contains 18 productions, not counting close vectors, while the equivalent PSG contains 32. The present algorithm also handles a slight extension to the context-free languages. It should be noted that, while the noun phrase PSG of FIG. 1A contains two ADJS productions, the equivalent RVG of FIG. 1B contains no references to ADJS at all. While the ADJS productions are used to describe the iteration of multiple adjectives, the RVG describes this construct directly within the condition and results vectors associated with its adj production. The RVG of FIG. 1B is therefore only weakly equivalent to the PSG of FIG. 1A. This extension corresponds to the Kleene star notation sometimes utilized with PSGs. In general, the interaction of bits in RVG vectors can be quite complex and other extensions may be realized as well.

5) An RVG Compiler

The RVG compiler translates context-free grammars in the traditional phrase structure grammar form, as used by Earley's algorithm, into the register vector grammar form used by the new parsing algorithm. The key technique on which the RVG compiler is based is the use of finite-state machines as an intermediate form. Briefly, a finite-state machine, or finite-state automaton (FSA), is a five-tuple $M = (S, \Sigma, T, s_0, F)$, where: (1) S is a finite set of states, (2) $\Sigma$ is a finite set of permissible input tokens (i.e., the alphabet of the machine), (3) T is a transition function or table which maps a state and an input token to zero or more other states, (4) $s_0$ is the initial state of the FSA (i.e. the state to which no other states transition), and (5) F is the set of final states of the FSA (i.e. the states which do not transition to any other states). An FSA processes a string of input tokens by transitioning from state to state as directed by the current state, the next input token, and the transition function T. If a final state can be reached from the initial state after processing the entire input string, then the string is said to be accepted. A graphical notation is associated with FSA in which states are represented by circles, and transitions by arrows which are labeled with the input tokens they recognize. Thick (or double) circles are used to distinguish final states while the start state is usually positioned at the left.

The usefulness of finite-state machines in RVG compilation is that the subgrammar for any nonterminal, in either PSG or RVG, can be modeled by an FSA. FIG. 10, for example, illustrates an FSA for the subgrammar defined by the VP (verb phrase) production from FIG. 3C. The difference between PSG and RVG is in what aspect of the FSA each production encodes. A PSG production encodes a sequence of transitions from the initial state to a final state (i.e. a single, but complete path through the FSA.) Thus, the production VP →AUX verb NP PP represents the path encircled along the top of FIG. 10. An RVG production represents a single state including all of its input and output transitions. Thus, state 2 and its four input and output transitions are represented by the RVG production <verb, 21222, 00111>.

A method for compiling the PSG productions for a given nonterminal into RVG is apparently straightforward. First, translate the productions into an FSA such that each is represented by an independent sequence of transitions beginning at the initial state. Then translate each of the FSA states into an RVG production, according to a mapping technique described in Section 7 below. Repeating this process for each nonterminal translates an entire PSG into RVG.

Figure 11:
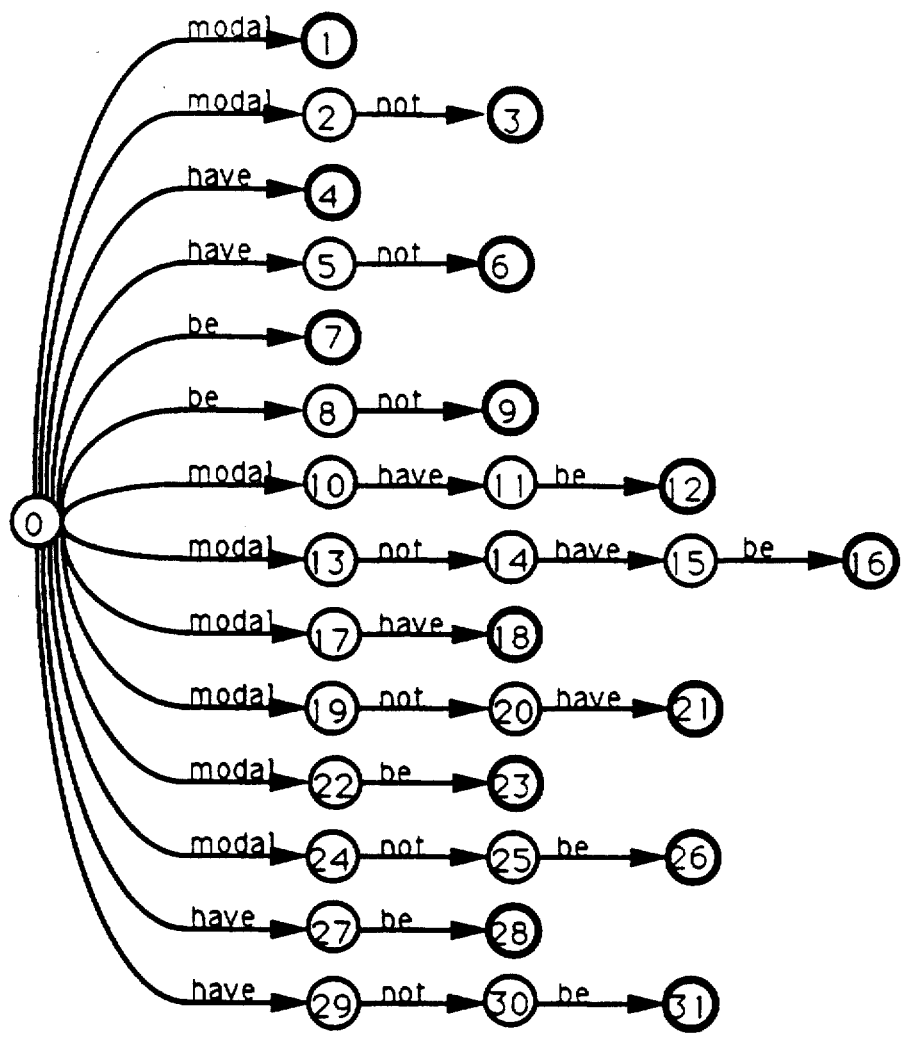
FIG. 11 illustrates the FSA that would be generated for the AUX productions from FIG. 3A, in accordance with the present invention.

Unfortunately, there is one problem with this scheme. FIG. 11 illustrates the FSA that would be generated for the AUX (auxiliary verb) productions from FIG. 3C. While only 14 PSG productions were required to represent AUX, the RVG generated from this FSA would contain 31 productions — one per state (minus the start state). The problem is that while we could have mapped the AUX PSG into an infinite number of different but descriptively equivalent FSA's, we want the one with the least number of states. We must therefore reduce the intermediate FSA representation before translating its states into RVG productions.

6) FSA Reduction

The theory of finite-state automatons is well developed and a variety of algorithms exist for reducing and otherwise transforming FSAs from one form to another. In particular, it can be shown that any FSA can be reduced into an equivalent FSA which is guaranteed to have the least possible number of states through the following steps:

1. removal of $\epsilon$-transitions (i.e. transitions from one state to another on the empty string $\epsilon$),
2. removal of nondeterminism,
3. removal of inaccessible states,
4. identification and merging of indistinguishable states.

Since the PSG→FSA mapping described in the previous section does not generate $\epsilon$-transitions, Step 1 need not be performed by the RVG compiler. However, algorithms for the remaining steps are required.

Figures 12, 13:
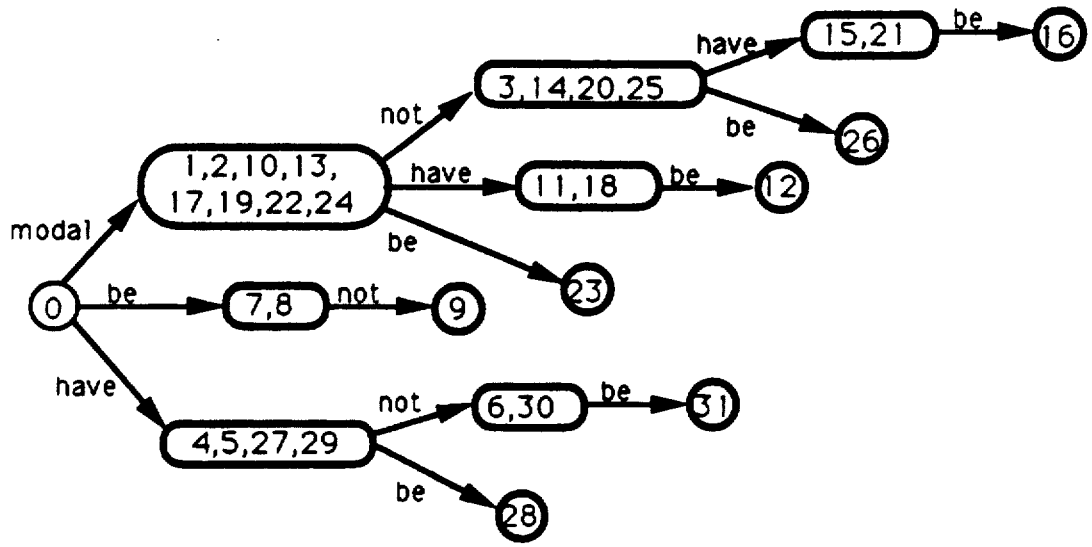
FIG. 12 presents an algorithm for performing steps of a technique for reducing an FSA into an equivalent FSA having the least number of states, in accordance with the present invention.
FIG. 13 shows the FSA of FIG. 11 after reduction by the technique of FIG. 12.

FIG. 12 presents an algorithm for performing Steps 2 and 3 together which is adapted from *Principles of Compiler Design*, A.V. Aho and J. D. Ullman, Addison-Wesley Publishing Company, Reading, Massachusetts, 1977, pages 91-94. The algorithm translates a nondeterministic FSA into a deterministic FSA by merging together those states which the machine may be in after processing some substring $a_1, a_2,..., a_k$. For example, after the single token modal, the FSA from FIG. 11 may be in any of states 1, 2, 10, 13, 17, 19, 22, or 24. FIG. 13 shows the FSA after the application of the algorithm. The given states as well as six other sets of states have been merged to produce an FSA which now has only 15 states.

Step 4 of the FSA reduction process also requires certain states to be merged. However, this time those states are merged which cannot be distinguished by any subsequent substring $a_{k+1}, a_{k+2}, ..., a_n$ leading to a final state. For example, be is the only token that can be processed from the following states (now sets of states) of the deterministic AUX FSA: {15,21}, {11,18}, and {6,30}. These states are therefore indistinguishable and can be merged by changing all of the references to them in the transition table to the new state {6,11,15,18,21,30}. FIG. 14 presents the pairs Table algorithm for identifying which states to merge which is adapted from *Compiler Construction: Theory and Practice*, by W. A. Barrett and J. D. Couch, Science Research Associates, Inc., Chicago, Illinois, 1979, pages 88-97. The final, fully reduced FSA for the auxiliary verb subgrammar is given in FIG. 15. Note that the FSA now has a total of only seven states.

7) Mapping into RVG

Figure 15:
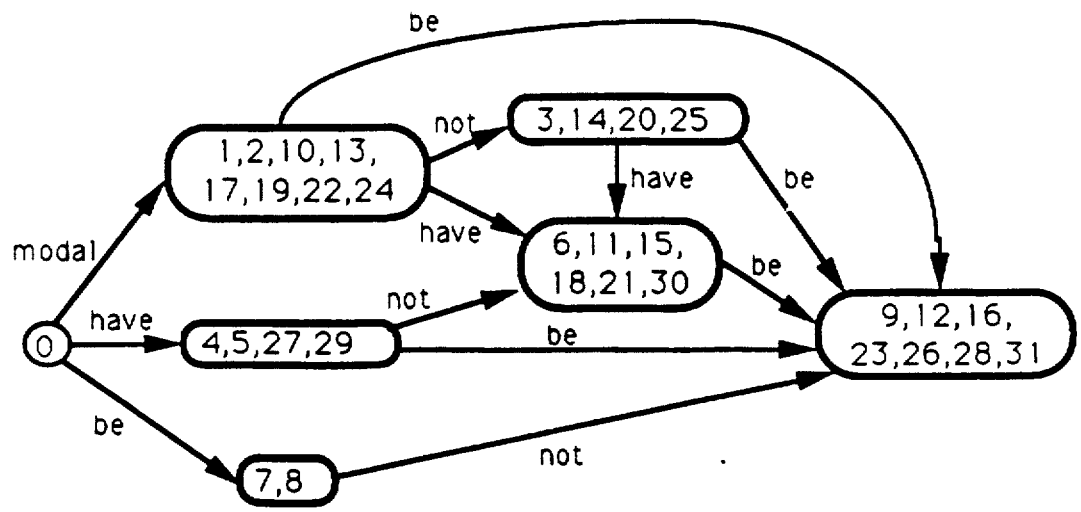
FIG. 15 shows the final, fully reduced FSA for the auxiliary verb subgrammar.

In addition to having the fewest states possible, the FSA of FIG. 15 has another characteristic which is not shared by its earlier counterparts — a state may now be transitioned to on different input tokens. For example, the merged state {6,11,15,18,21,30} may be arrived at via either the token have or the token not. This characteristic presents the problem that a single RVG production may no longer be sufficient to represent each state. In particular, two productions are necessary to represent the {6,11,15,18,21,30} state, one whose category is have while another whose category is not. While such a mapping is still possible, a much simpler one is possible if we modify the algorithm of FIG. 14 so as to prohibit the merging of two states if they have input transitions on different tokens. This may be done by adding the following condition to the algorithm at the location marked by †:

"and $(T(t_i,a)=s_i$ and $T(t_j,b)=s_j$ iff $a=b$, for every $a,b$ in $\Sigma$ and $t_i, t_j$ in $S$)"

Figure 16:
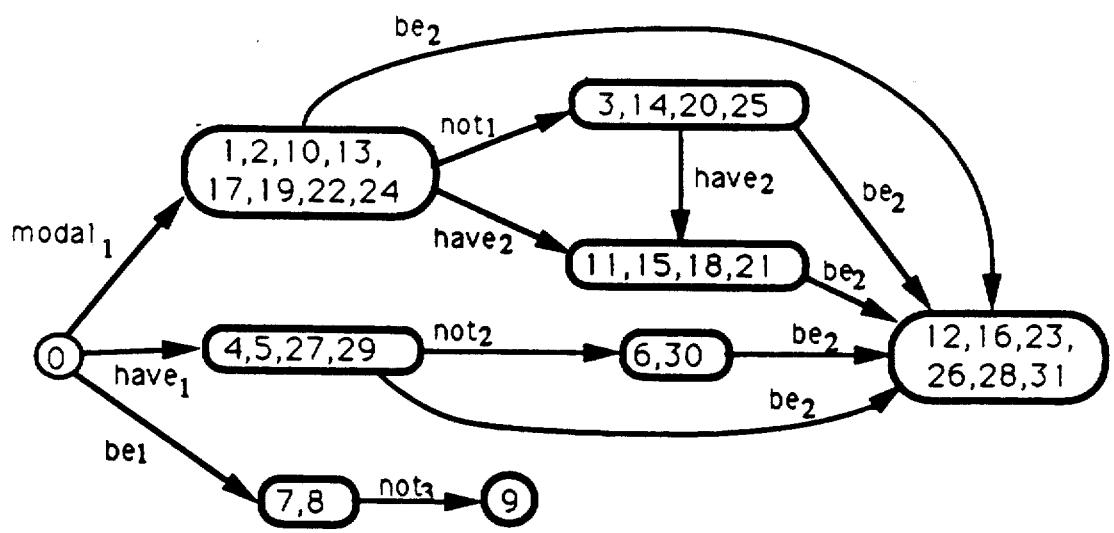
FIG. 16 shows an AUX FSA produced by a modified form of the Pairs Table algorithm of FIG. 14, in accordance with the present invention.

The Pairs Table algorithm, modified in this manner, produces the AUX FSA shown in FIG. 16. Although this FSA has two more states than that of FIG. 15, it may be mapped into RVG as follows:

1. Distinguish the input tokens which transition to each state from those which transition to other states. This is shown in FIG. 16 by the subscripts associated with the tokens.
2. Set up an RVG definition table as shown in FIG. 17. Each row of the table defines an RVG production, including the initialization and close vectors.
3. The initial state is mapped into the initialization vector of the table. The vector contains a 1 for each token on which there is a transition from the initial state, and a 0 for each remaining token. 4. Each of the remaining FSA states is mapped into the RVG production in the table whose category matches the state's input token.
   (a) The condition vector of the production contains a 1 for its own category and a 2 for the remaining tokens.
   (b) The result vector of the production contains a 1 for each token on which the state transitions to some other state, and a 0 for the remaining tokens (except for the one marked close).
   (c) If the state is final, then the close token of the result vector contains a 1, otherwise it contains a 0.
5. The close vector contains a 2 for each token and a 1 for the close token.

This mapping produces an RVG in which each production essentially tests to see if its own category (i.e. state) is enabled, and then enables those categories (i.e. states) which may come next. The initialization vector enables those categories which may come first, and the close vector is enabled by those categories which may come last.

8) Optimization

While the FSA→RVG mapping described above is relatively straightforward, it is not optimal. For example, FIG. 18 shows a different RVG for English auxilaries which requires considerable time for optimizing by hand. This grammar contains two less productions than the one generated by the RVG compiler, and its condition and result vectors are five bits smaller.

In general, the efficiency of an RVG can be measured in two ways —by the number n of productions it contains, and by the width w of the vectors used by the productions. Since the RVG parser is insensitive to vector width (i.e. it exploits "vector-wide" primitives rvg-match and rvg-apply), w does not affect parsing efficiency. However, n does. Theoretically, for an RVG generated from a set of PSG rules, the least number of productions possible is the total number of distinct tokens on the right-hand sides of the rules. Thus, in FIG. 3C, the RVG encodings for S, NP, VP, and PP are in fact optimum (with respect to n). However, while the lower bound for n given the AUX subgrammar is four (one production for each of modal, not, have, and be), the RVG compiler produced eight productions.

While it is not known at the present time whether an algorithm exists which can produce an optimum RVG in all cases, it is apparent that the grammars produced by the RVG compiler can be optimized to some degree.

SUMMARY

The new RVG-based parsing algorithm offers substantial improvements over Earley's and other parsing algorithms. In terms of power, the algorithm handles a superset of the general class of context-free languages. In terms of efficiency, the algorithm operates in $\theta(n^3)$ time, due to its use of Earley's control structure, but also is significantly faster than Earley's algorithm, due to its use of functionally complex RVGs. This combination of techniques renders the algorithm relatively insensitive to the branching factors of grammars thereby exploiting all types of context-free grammars, and large ones in particular. Considering the size and branching factors of competent natural language grammars, this makes the present algorithm particularly well-suited for the parsing of natural languages. In terms of grammar size, the grammars used by the present algorithm are usually smaller than their equivalent PSGs.

In addition, context-free PSGs may be compiled into the form of RVG. RVGs may be executed by the context-free RVG parser to parse natural languages and other large ambiguous languages more efficiently. The PSG→RVG compiler enables natural language system developers to design grammars at the phrase structure rule level, but to execute them at the RVG level. This approach maximizes both the understandability and efficiency of syntactic analysis.

What is claimed is:

1. A method, utilizing a data processing system, for compiling context-free phase structure grammar productions into context-free register vector grammar productions and parsing a word string, said method comprising the steps of:
   a) translating the phase structure grammar productions for a given nonterminal category into a finite-state automaton such that each phase structure grammar production is represented by an independent sequence of transitions beginning at an initial state;
   b) reducing the finite-state automaton by removing nondeterminism, removing inaccessible states, and merging indistinguishable states;
   c) translating each of the finite-state automaton states into a register vector grammar production; and
   d) repeating steps a) -c) for each nonterminal category to translate the entire phrase structure grammar into register vector grammar; and
   e) parsing a word string to determine whether the word string is a member of the language defined by the register vector grammar.

2. The method of claim 1 wherein step c) is performed by:
   (1) distinguishing input tokens which transition to each state from input tokens which transition to other states;
   (2) setting up a register vector grammar table having rows defining register vector grammar productions, including an initialization vector and a close vector, and columns defining the category c, condition vector cv, and result vector rv of each production;
   93) mapping the initial state into the initialization vector containing 1 for each token on which there is a transition from the initial state and a 0 for each remaining token;
   (4) mapping each of the remaining states into a row of the register vector grammar table, wherein:
      (a) the category of the production is the same as the state's input token;
      (b) the condition vector of the production contains a 1 for the token on which the state transitions to some other state and a 0 for the remaining tokens except for one marked close; and
      (d) if the state is final, then the close token of the result vector contains a 1 and otherwise contains a 0; and
   (5) assigning the close vector a 1 for the close token and a 2 for the remaining tokens.

3. The method as claimed in claim 1 wherein the merging of the indistinguishable states in step b) comprises utilizing the Pairs Table algorithm.

---

```
let feasible-pairs = φ;
for each pair of distinct states s_i and s_j in S_D do
    if ({s_i, s_j} F_D or {s_i, s_j} S_D -F_D) and
       (T_D(s_i, a) = φ iff T_D(s_j, a) = φ, for every token a in Σ)
       [″]and (T(t_i,a)=s_i and T(t_j,b)=s_j iff a=b, for every a,b
    in Σ and t_i,i_j in S), then
       add {s_i,s_j} to feasible-pairs;
let pairs-table be a table of sets of states, whose rows are indexed by the
    {s_i,s_j} of feasible-pairs and whose columns are indexed by the tokens of Σ;
for each set {s_i,s_j} in feasible-pairs do
    for each token a in Σ do
       set pairs-table({s_i,s_j}, a) to {T_D(s_i,a),T_D(s_j,a)};
```

```
-continued
let indistinguishable-states = feasible-pairs;
repeat
    for each set {s_i,s_j} in indistinguishable-states do
        for each token α in Σ do
            let {t_i,t_j} = pairs-table({s_i,s_j}, α);
            if (t_i ≠ t_j ≠ φ) and ({t_i,t_j} not in indistinguishable-states or feasible-pairs) then
                remove {s_i,s_j} from indistinguishable-states;
until no more sets {s_i,s_j} can be removed from indistinguishable-states;
```

4. The method of claim 1, wherein the word string has n tokens $X_0, X_1 X_2 \ldots X_i \ldots X_{n-1}$, followed by a dummy terminator symbol $X_n$, and wherein step e) is performed by the steps of:

(1) constructing a set of states $S_i$, where i initially equals 0, containing the single state $<c, v, f>$, where c is the root category of the grammar, v is the initialization vector associated with c, and f equals 0;

(2) processing the state in set $S_i$ by scanning the register vector grammar productions associated with c to find those productions whose condition vector cv matches v, using a rvg-match operation;

93) for those register vector grammar productions whose category is nonterminal and which in step (2) match, applying a predict operation to the state and to the production by adding to set $S_2$ a new state consisting of the production's nonterminal category, the initialization vector of the category, and index i;

(4) for those register vector grammar productions whose category is terminal and which in step (2) match, with the terminal being the same as input token $X_i$, applying a shift operation to the production and to the state by adding to set $S_{i+1}$ a copy of the state being processed, with the vector thereof updated by applying the result vector rv of the production to v, using an rvg-apply operation;

(5) matching the close vector associated with c to v to determine whether the complete operation is applicable to the state;

(6) recognizing each state $<d, w, g,>$ in set $S_f$ in which d is nonterminal, d has a production whose category is c, and the cv of the production matches w, using the rvg-match operation; and (2) adding to set $S_i$ a copy of each state $<d, w, g>$ with the vector thereof updated by applying the rv of the production to w using the rvg-apply operation;

(7) repeating steps (2)-(6) for each additional state $<c, v, f>$) in set $S_i$ added by steps (g) and (j);

(8) repeating steps (20-(7) for sets $S_1 \ldots S_n$;

(9) matching the close vector of the root category c with the vector v of each state in set $S_n$ whose category is c, using the rvg-match operation; and

(10) recognizing a successful parse of the word string when a match of step (9) is successful, and otherwise recognizing that the word string is not a member of the language defined by the register vector grammar.

* * * * *